No. 705,746. Patented July 29, 1902.
J. H. FORISTER.
COTTON CHOPPER.
(Application filed Nov. 6, 1901.)

(No Model.) 2 Sheets—Sheet 1.

J. H. Forister, Inventor.

Witnesses
by C. A. Snow & Co.
Attorneys

UNITED STATES PATENT OFFICE.

JOHN H. FORISTER, OF EVELYN, TEXAS, ASSIGNOR OF ONE-HALF TO JAMES N. McADA.

COTTON-CHOPPER.

SPECIFICATION forming part of Letters Patent No. 705,746, dated July 29, 1902.

Application filed November 6, 1901. Serial No. 81,323. (No model.)

*To all whom it may concern:*

Be it known that I, JOHN H. FORISTER, a citizen of the United States, residing at Evelyn, in the county of Travis and State of Texas, have invented a new and useful Cotton-Chopper, of which the following is a specification.

My invention is an improved combined cotton chopper and cultivator; and it consists in the peculiar construction and combination of devices hereinafter fully set forth and claimed.

Figures 1, 4:
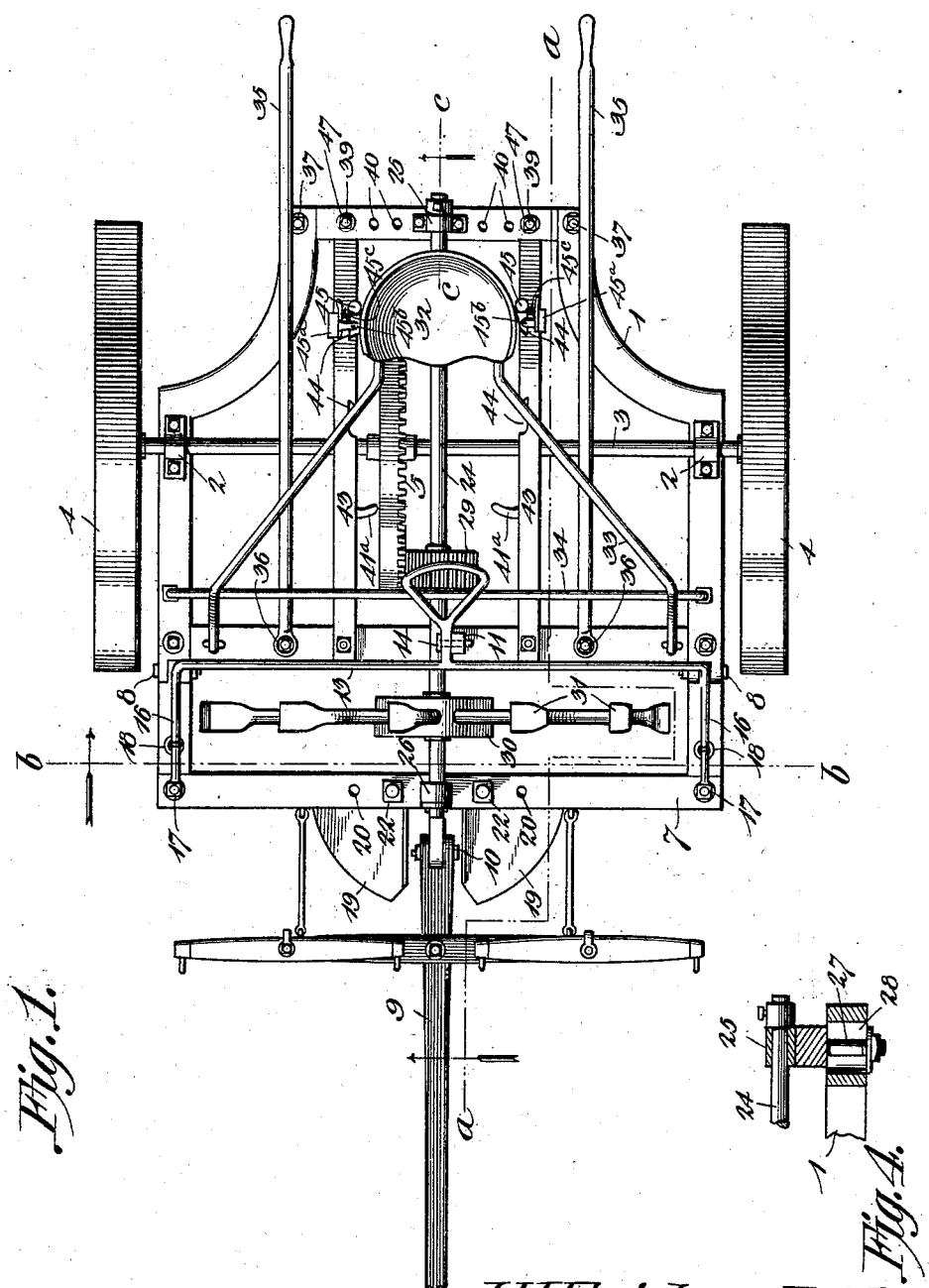
Figure 2:
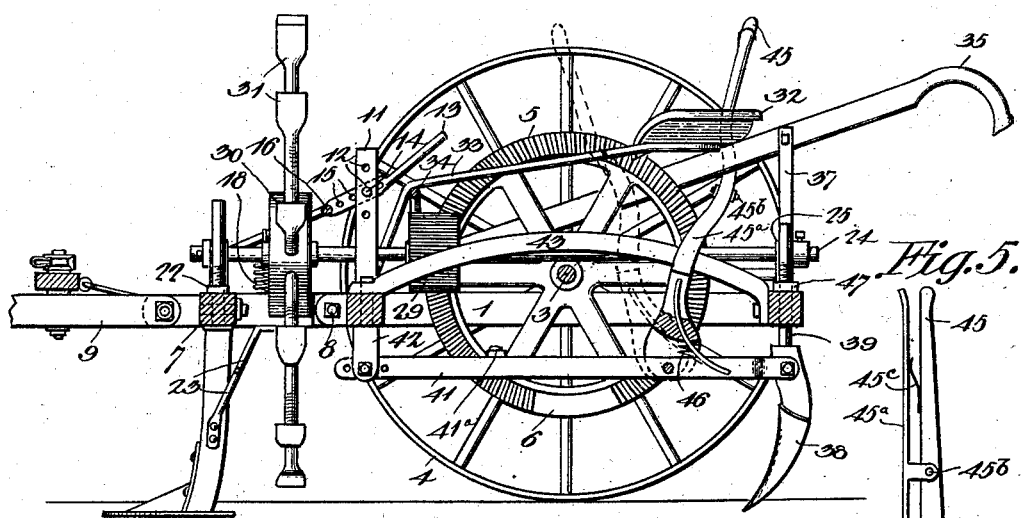
Figure 3:
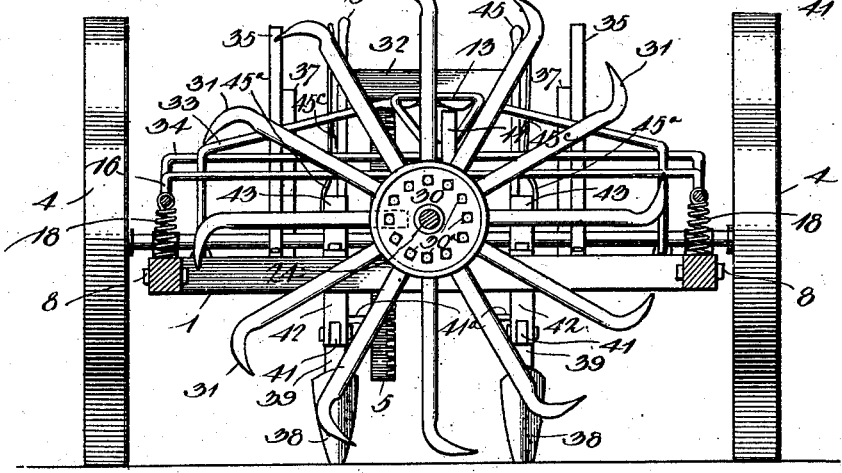

In the accompanying drawings, Figure 1 is a top plan view of a combined cotton chopper and cultivator embodying my improvements. Fig. 2 is a vertical longitudinal sectional view of the same, taken on a plane indicated by the line *a a* of Fig. 1. Fig. 3 is a transverse sectional view of the same, taken on a plane indicated by the line *b b* of Fig. 1 and looking toward the rear end of the machine. Fig. 4 is a detail view showing the adjustable bearing. Fig. 5 is a detail elevation, partly in section, showing one of the levers for raising and lowering the cultivating-plows and its connections.

In the embodiment of my invention I provide a main frame 1, which may be either of the form here shown or of any other suitable construction. Said main frame is provided at its sides at points about midway between its front and rear ends with bearings 2, in which is journaled an axle-shaft 3, which is provided with ground-wheels 4. One of the latter is preferably loose on the said shaft and connected thereto by the usual pawl-and-ratchet mechanism (not here shown) to enable the machine to be readily turned at the end of a row. On the said axle-shaft, near the center thereof, is secured a gear-wheel 5. The gear-teeth of the said gear-wheel 5 are on one side of the same, and one or more blank spaces 6 divide the said gear-teeth.

A front frame-section 7 is flexibly connected to the front end of the main frame 1, as by the hinged joints 8. Thereby the front frame-section may be raised or lowered. To the said front frame-section is connected a tongue 9, as at 10.

A standard 11 is secured to and rises from the front portion of the main frame 1 near the center thereof and is provided with a series of adjusting-openings 12, which are disposed one above another, as shown in Fig. 2. A handle 13 is adjustably connected to the standard 11 by a pin or bolt 14, which engages one of the openings 12 and one of a series of openings 15, with which said handle is provided. The said handle 23 is forked, as shown, and the front ends of the arms 16 thereof are secured to the front corners of the frame-section 7, as at 17. Springs 18, which are here shown as coiled extensile springs, bear between the arms 16 of said handle and the sides of the front frame-section 7. By means of the said handle the front frame-section 7 may be tilted or inclined, and hence the front side of the main frame 1, which is connected thereto by the hinged joints 8, may be raised or lowered, the main frame turning on the axle-shaft 3 and the outer end of the tongue being supported from the necks of the team. When the main frame has been thus adjusted, the pin 14 is appropriately reinserted in alined openings in the handle and standard to secure the main frame at the desired adjustment.

A pair of scraping-plows 19, which are disposed side by side at a suitable distance apart, have their standards adjustably secured to the front bar of the frame-section 7, the latter being provided with a series of adjusting-openings 20 to receive the upper reduced portions 21 of the said standards. The said plows by reason of the said adjusting-openings 20 will be set at any desired distance apart. Taps 22, which are screwed on the upper reduced portions of the said standards, secure the said plows to the said frame-section 7. The standards of the said scraping-plows are further secured by braces 23, which are also adjustable.

A longitudinally-disposed shaft 24 is journaled in a bearing 25 at the rear end of the main frame 1, at the center thereof, and in a bearing 26 on the center of the cross-bar of the front frame-section 7. The said bearing 25 has a depending arm 27, which operates in a slot 28 in the rear side of the frame 1, which slot admits of the longitudinal movement of said bearing. A pinion 29 is keyed or otherwise secured to the shaft 24 and is engaged by the gear 5. On the said shaft 24, near the front end thereof, is secured a revoluble member 30, which carries a series of radially-disposed chopping-hoes 31.

A seat 32 is supported by a forked bar 33. The front ends of the arms of the said forked bar are secured to the front side of the main frame 1 and bear upon an arched supporting-bar 34, which is disposed transversely of the said frame. It will be observed by reference to the drawings that the seat is disposed in rear of the axle-shaft 3, and it will be understood that when the machine is being driven the weight of the driver on the seat tends to raise the front end of the frame 1, and thereby the said frame is balanced on the axle-shaft, hence requiring the exercise of but little power in the operation of the handle 13 to raise or lower the front end of frame 1 and the flexibly-connected front frame-section 7 to raise or lower the scraping-plows 19 to cause the same to operate in the soil at any desired depth on opposite sides of a row of plants. These scraping-plows serve to destroy weeds and to form a ridge occupied by the row of plants, and the revoluble chopper which operates transversely of the ridge and in rear of the scraping-plows serves to chop out the superfluous plants and to leave "stands" at suitable distances apart. In order to thus leave the stands, the gear-wheel 5 is provided with a blank space or spaces 6, which cause the pinion 29 to be momentarily disengaged from the gear 5 while the latter is in rotation, and hence momentarily arrest the rotation of the chopping-hoes. The springs 18 serve to cushion the connections between the handle 13 and the front section 7 of the frame and cause the machine to run more easily than it otherwise would. Furthermore, the said springs act as link connections between the said handle 13 and the said frame-section 7. The movable bearing-block 25 permits the necessary play between the shaft 24 and the rear side of the frame 1 when the plows are raised and lowered. The said plows are raised clear of the ground to enable the machine to be turned at the end of a row.

To enable the machine to be controlled by a plowman walking in rear thereof, I provide a pair of rearwardly-extending handles 35, which are secured at their front ends to the front side of frame 1, as at 36, and are connected to the rear side of said frame by braces 37.

A pair of cultivating-plows 38 are carried by standards 39, which are attached to the rear side of the frame 1. The latter has a series of adjusting-openings 40 to receive the upper reduced ends of said standards and adapt the said cultivating-plows to be disposed at any desired lateral adjustment to vary the width of the space between them as may be required. The said standards 39 are movable vertically in the said openings to enable the said cultivating-plows to be raised and lowered. To each of the said standards is flexibly connected the rear end of a longitudinally-disposed bar 41, the front ends of said bars being pivotally connected to hangers 42, which depend from the front side of the frame 1. On the said frame at a suitable distance apart are secured a pair of longitudinally-disposed arch-bars 43, which are provided with notches 44 on their inner opposing sides. To each of the said bars 41 is pivoted the lower end of a lever 45. The latter are fulcrumed in appropriate notches 44 of the arch-bar 43, and by turning said levers the rear ends of the bars 41, and hence the said cultivating-plows, may be raised or lowered, as will be understood. By shifting the said levers 45 in the said notches 44 the power of the said levers may be increased or diminished, as may be desired, and, furthermore, they may be so disposed as to be grasped and operated either from the rear of the machine or from the seat 32. Springs 46 bear between the lower ends of the said levers 45 and the said bars 41, and in connection with the levers 45 and the bars 41 normally depress the cultivating-plows and permit a certain degree of vertical lost motion of the cultivating-plows to enable them to pass over obstructions without being broken thereby. The depth at which the cultivating-plows operate on opposite sides of the rows of plants may be predetermined by adjusting-taps on the upper screw-threaded ends of the standards 39. In practice I provide the bars 41 with suitable rests 41$^a$ for the driver's feet. I also construct the hub 30 and the chopping-hoes 31 so that the latter are radially adjustable to enable them to be set for operation at any desired depth in the soil and provide set-screws 30$^a$ to secure said chopping-hoes at any desired radial adjustment.

The levers 45 are adapted to play vertically in the notches 44 of the arch-bars 43 to accommodate themselves to the motion of the plows 38, and to prevent said levers from being disengaged from said notches when the same is not desired I provide spring-clasps 45$^a$, which are fulcrumed to said levers, as at 45$^b$, and engage the outer sides of said arch-bars, as shown, springs 45$^c$ being interposed between said levers and said spring-clasps.

Having thus described my invention, I claim—

1. In a combined cotton chopper and cultivator, the combination of a main frame, a supporting-axle therefor, a front section flexibly connected to the said main frame, a tongue attached to the said front section, plows carried by the latter, a longitudinally-disposed shaft having its bearings on said front section and at the rear side of said main section, a revoluble chopping element carried by said shaft, connections between said axle and said shaft, to rotate the latter, a handle attached to the said front section, and a support on said main frame, to which said handle is adjustably connected, whereby said plows and said chopping element may be raised and lowered, substantially as described.

2. In a combined cotton chopper and cultivator, the combination of a main frame, a supporting-axle therefor, a front section flexibly connected to the said main frame, a tongue attached to the said front section, plows carried by the latter, a longitudinally-disposed shaft having its bearings on said front section and at the rear side of said main section, a revoluble chopping element carried by said shaft, connections between said axle and said shaft, to rotate the latter, a handle attached to the said front section, spring connections between said handle and said front section, and a support on said main frame, to which said handle is adjustably connected, whereby said plows and said chopping element may be raised and lowered, substantially as described.

3. In a combined cotton chopper and cultivator, the combination of a frame, a pair of scraping-plows at the front end thereof, a revoluble chopping element in rear of said scraping-plows, a pair of longitudinally-disposed bars, flexibly connected at their front ends, to said frame and having cultivating-plows at their rear ends, in rear of said chopping element, levers connected to said bars, to raise and lower said cultivating-plows, and fulcrum-supports on which said levers are shiftable, longitudinally of the said frame, the latter having a seat, and rearwardly-extending handles, whereby said levers may be shifted for operation either from said seat, or from the rear of the machine, substantially as described.

4. In a combined cotton chopper and cultivator, the combination of a frame, a pair of scraping-plows at the front end thereof, a revoluble chopping element in rear of said scraping-plows, a pair of longitudinally-disposed bars, flexibly connected at their front ends to said frame and having cultivating-plows at their rear ends, in rear of said chopping element, levers connected to said bars, to raise and lower said cultivating-plows, and spring connections between said levers and said bars, substantially as described.

In testimony that I claim the foregoing as my own I have hereto affixed my signature in the presence of two witnesses.

JOHN H. FORISTER.

Witnesses:
J. N. FORISTER,
S. E. PALMER.